US006068037A

United States Patent [19]

[11] Patent Number: 6,068,037

[45] Date of Patent: May 30, 2000

Yeager et al.

[54] PROCESS FOR BUSINESS FORM WITH INTEGRATED LABEL

[76] Inventors: Thomas Yeager, 801 Glencorse Dr., St. Charles, Mo. 63304; Charles Casagrande, 423 S. Elmwood, Aurora, Ill. 60506

[21] Appl. No.: 08/998,397

[22] Filed: Dec. 24, 1997

Related U.S. Application Data

[62] Division of application No. 08/683,359, Jul. 18, 1996, abandoned, which is a continuation of application No. 08/409,203, Mar. 23, 1995, abandoned.

[51] Int. Cl.[7] .............................. B65C 9/00; B44C 1/165; B32B 31/00

[52] U.S. Cl. .......................... 156/566; 156/230; 156/238; 156/247; 156/297; 156/DIG. 31

[58] Field of Search .................................... 156/230, 238, 156/247, 248, 264, 289, 566, 297, DIG. 19, DIG. 20, DIG. 31, DIG. 33, DIG. 40

[56] References Cited

U.S. PATENT DOCUMENTS

| | | | |
|---|---|---|---|
| 3,792,542 | 2/1974 | Cohan . | |
| 3,854,229 | 12/1974 | Morgan . | |
| 4,379,573 | 4/1983 | Lomeli . | |
| 4,854,610 | 8/1989 | Kwiatek . | |
| 4,861,636 | 8/1989 | Barnette . | |
| 4,890,862 | 1/1990 | Buchholz . | |
| 4,910,058 | 3/1990 | Jameson . | |
| 5,098,759 | 3/1992 | Felix . | |
| 5,131,686 | 7/1992 | Carlson . | |
| 5,249,828 | 10/1993 | Axelrod . | |
| 5,279,875 | 1/1994 | Juszak . | |
| 5,281,799 | 1/1994 | McIntire . | |
| 5,320,387 | 6/1994 | Carlson . | |
| 5,324,153 | 6/1994 | Chess | 412/9 |
| 5,403,236 | 4/1995 | Greig . | |
| 5,410,136 | 4/1995 | McIntire . | |
| 5,413,830 | 5/1995 | Edwards . | |
| 5,427,416 | 6/1995 | Birch . | |
| 5,435,601 | 7/1995 | Casari . | |
| 5,439,255 | 8/1995 | McIntire . | |
| 5,441,796 | 8/1995 | Steidinger . | |
| 5,466,013 | 11/1995 | Garrison | 283/107 |
| 5,509,992 | 4/1996 | Axelrod . | |
| 5,601,313 | 2/1997 | Konkol . | |

*Primary Examiner*—Richard Crispino
*Assistant Examiner*—J. A. Lorengo
*Attorney, Agent, or Firm*—Michael T. Marrah; Gregory E. Upchurch; Grant D. Kang

[57] ABSTRACT

A business form with label areas removable therefrom and an improved process for producing a label. The process includes feeding a sheet of paper into a paper processing apparatus, having a roll of transfer adhesive stock with a first and second liner with adhesive therebetween, means for separating the second liner from the transfer adhesive stock, cutting a strip of transfer adhesive stock from the roll of transfer adhesive stock and adhering the transfer adhesive stock to the sheet of paper whereby it can be cut to form a label peelable from the transfer adhesive stock. In addition, a transfer adhesive stock comprising a first and second liner with a layer of pressure sensitive adhesive between one side of the first liner and one side of the second liner, each liner having a different adhesive affinity whereby one liner may be removed from the other liner and adhesive.

2 Claims, 3 Drawing Sheets

PROCESS FOR BUSINESS FORM WITH INTEGRATED LABEL

This application is a divisional application of Ser. No. 08/683,359, filed Jul. 18, 1996, now abandoned, which is a CPA of Ser. No. 08/409,203, filed Mar. 23, 1995, now abandoned.

BACKGROUND OF THE INVENTION

This invention relates generally to a business form with removable label, as improved process for producing the same, and an improved transfer adhesive stock for producing a removable label.

The use of business forms having removable labels has become commonplace in not only industry but the lives of nearly everyone. A business will often imprint information which then can be transferred to a document by the use of a label. For example, a label may be pre-printed with a name and address that can be used in sending return correspondence. Similarly, the label can request certain information. The requested information can be written on the label and the label then placed on an envelope or other such document.

These labels are commonly referred to as "integrated labels". Generally, they are comprised of two layers of materials. The first or lower layer has a pressure sensitive adhesive on its bottom surface and an adhesive on its upper surface which detachably secures a second layer, a paper label, thereto. Another version of an integrated label has a lower layer with pressure sensitive adhesive on its upper surface which detachably secures the paper label thereto, no adhesive is applied to the bottom surface of the lower layer.

In addition, there are different methods of producing such labels. One may refer to U.S. Pat. No. 4,379,573, issued Apr. 12, 1983 and U.S. Pat. No. 5,324,153, issued Jun. 28, 1994, for a general discussion thereof. Prior labels generally were produced with self-wound transfer tape. This consisted of a single release liner ply with adhesive. This liner ply was coated with a silicone release material on the top and bottom surfaces of the liner ply. There was a difference in adhesive affinity between the top and bottom surfaces. A pressure sensitive adhesive then was applied to one side of the liner. The liner with adhesive was wound upon itself (hence the term "self-wound"). Because of the difference in adhesive affinity on each side of the liner, when the liner was unwound, the adhesive stays firmly in contact with the side of the liner with the "tighter" release.

However, this self-wound transfer tape has several problems. The first problem is that the conventional transfer tape has a relatively low moisture content because of two exposures to heat for curing the silicone on each side of the tape. When wider transfer tapes (required for many integral labels) are applied there is a moisture content imbalance between the form and the tape. As the liner reaches equilibrium, it expands (especially across the grain). This results in wrinkles or buckles in the transfer tape atop the form. A second problem is that self-wound transfer tapes are relatively thick, approximately 3 mils. Another problem is the fact that since the tape is silicone coated on both sides, the forms when stacked have a tendency to slide around and not stay neatly stacked. In addition, the silicone coated side will not accept printing thereon. A further problem with using conventional self-wound transfer tape is that the rollers which guide the transfer tape during the "unwinding" process must be treated with special silicone laminate so that the tape does not stick to the rollers.

SUMMARY OF THE INVENTION

Among the several objects of this invention, may be noted the provision of an improved business form having a label or labels removable therefrom; an improved business form that utilizes transfer adhesive stock; an improved method of producing business forms; an improved label that is relatively thin; an improved label that is virtually wrinkle free; and an improved device for producing a business form which is simple and economical.

In general, the invention involves an improved device for producing an integral label removable from the business form comprising means for transporting a sheet of paper substrate having first and second faces. The invention further has a roll of transfer adhesive stock with first and second liners, sandwiching a layer of pressure sensitive adhesive between one side of the first liner and one side of the second liner. The invention also has means for cutting a strip of transfer adhesive stock from the roll of transfer adhesive stock and a vacuum cylinder for transporting such strips of transfer adhesive stock away from the cutting means with the adhesive of the transfer adhesive stock facing away from the vacuum cylinder. The invention further has means for positioning the vacuum cylinder with respect to the means for transporting the sheet so that the cut strip of transfer adhesive stock is applied to the second face of the sheet. Another feature of this invention is an improved transfer adhesive stock comprising a first and second liner with a layer of pressure sensitive adhesive sandwiched between one side of the first liner and one side of the second liner. Each liner has a different adhesive affinity whereby one liner may be removed from the other liner and adhesive.

Other objects and features will be in part apparent and in part pointed out hereafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
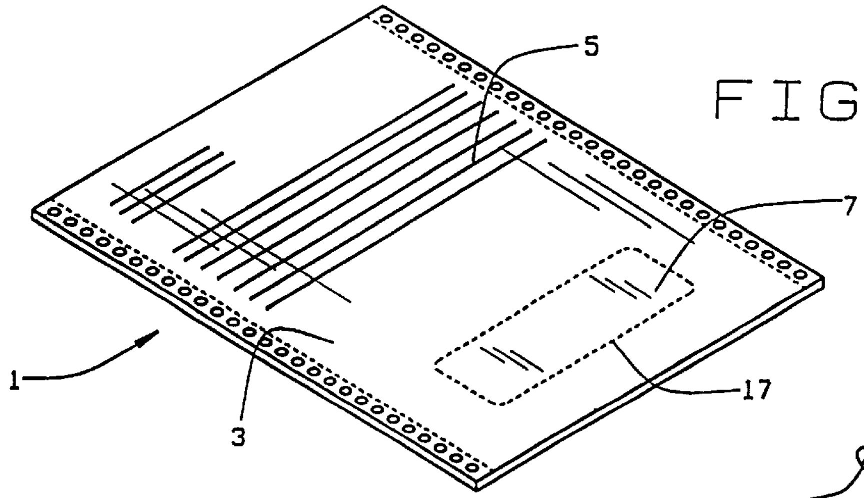
FIG. 1 is a perspective view of an exemplary business form provided with a removable label.
Figure 2:
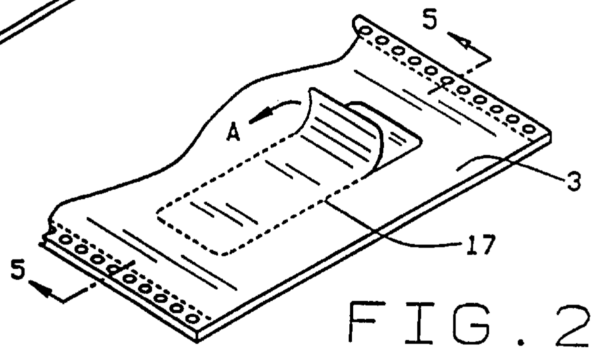
FIG. 2 is a partial view of the exemplary business form of FIG. 1 showing a label partially removed.
Figure 3:
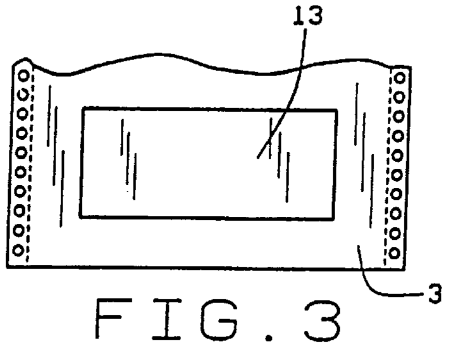
FIG. 3 is a bottom partial view of the exemplary business form.
Figure 4:
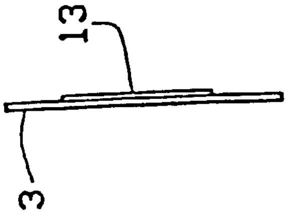
FIG. 4 is side view of the exemplary business form.
Figure 5:
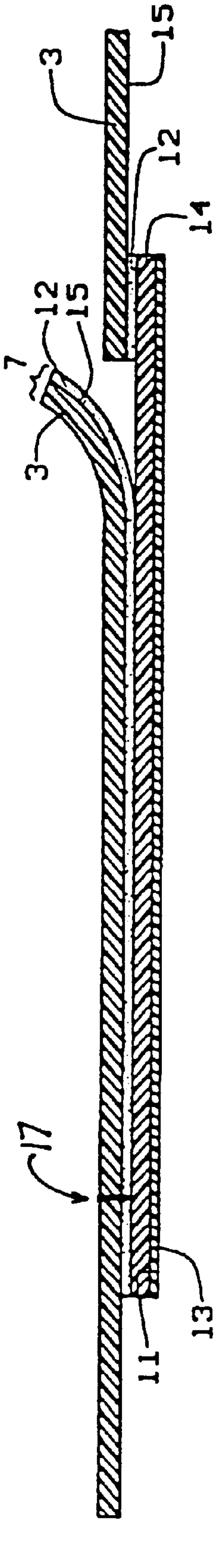
FIG. 5 is a sectional view of the business form of FIG. 2 taken along section line 5—5 thereof.

Referring to FIG. 1 there is generally indicated at 1 a business form of this invention. This form consists of a paper substrate 3 having printed matter 5 and a removable label 7 on the face thereof.

As shown in FIGS. 2–5, removable label 7 is formed in the substrate 3 and will be understood by those familiar in the art. Upper surface 11 of layer 13, which is a liner as will be understood by those familiar with the art, is provided with adhesive 12 thereon which transfers from layer 13 to the bottom surface 15 of substrate 3 when layer 13 is attached thereto. After layer 13 is adhesively secured to substrate 3 (as will be discussed later), the substrate 3 is die cut along line 17 to form label 7 which is peelable from layer 13 in the direction of arrow A. Label 7, due to the adhesive being transferred thereto from layer 13, may be secured to an ancillary piece of paper. It is preferred that layer 13 be as thin as possible in order to permit easy passage of the label form through conventional printers. However, it will be understood that layer 13 may be of any thickness.

Figure 6:
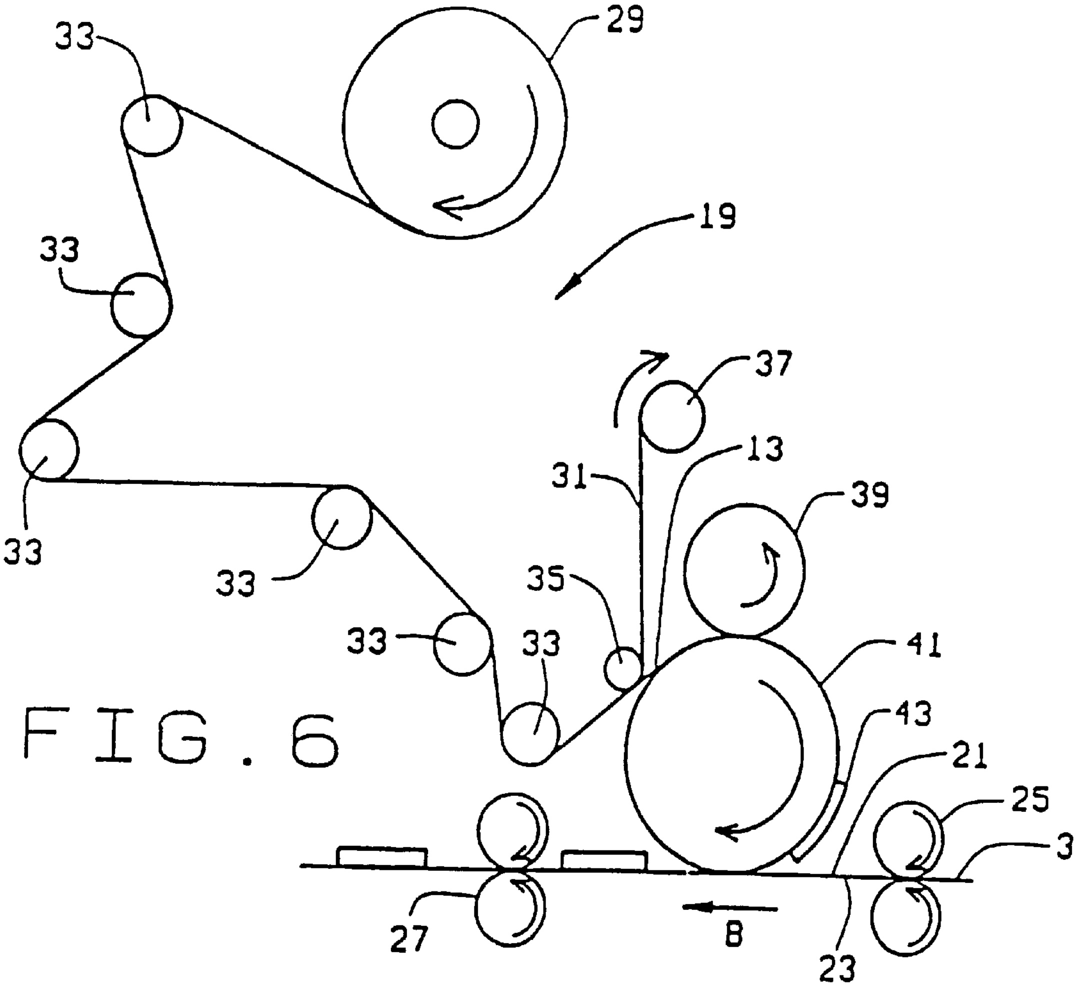
FIG. 6 is a schematic view of an exemplary apparatus for producing business forms with integral labels according to the present invention.

Turning now to FIG. 6, it shows at 19 one apparatus for practicing the methods of the present invention. A sheet of substrate 3 having a first face 21 and a second face 23, is processed through the apparatus. As will be understood by those familiar in the art, this sheet is formed into individual business forms. The sheet is typically of bond paper but may be of other materials as desired. It further will be understood by those familiar in the art that individual forms may be formed at the upstreamed side of the process.

Conventional means are provided for transporting the sheet in direction B. This transporting means can consist of a pair of powered tractors 25, 27 which pull the paper in a particular direction.

A wind of transfer adhesive stock 29 is provided in accordance with this invention in order to provide a label which is to be used with the sheet. The transfer adhesive stock 29 is comprised of two liners sandwiching a layer of pressure sensitive adhesive 12 between one side of the first liner and one side of the second liner. Each liner is treated with silicone 14 on one side only. The silicone treated side of each liner sandwiches a layer of pressure sensitive adhesive. The liners are designed to have different adhesive affinity so that when one liner 31 (the waste liner) is peeled away, the adhesive stays firmly in contact with the other liner. The transfer adhesive stock is fed by rollers 33 as will be understood by those familiar in the art. Unlike the prior art, it is not necessary for these rollers to have a silicone coating thereon since the adhesive remains sandwiched between the two liners. The transfer adhesive stock is ultimately fed to an idler bar 35 or some similar device which constitute means for removing one liner from the transfer adhesive stock and which separates the adhesive backing and produces a line of waste 37. The transfer adhesive stock, which now is very thin, consists of a liner and adhesive thereon. It then proceeds to a cut off cylinder 39 cooperating with a vacuum cylinder or some other type of static device to hold the transfer adhesive stock in place 41. It will be apparent that the liner is positioned to contact cylinder 41. The cut off cylinder cuts the wind of transfer adhesive stock into single strips 43. These strips of transfer adhesive stock are then applied to one face 21 (as shown) of the sheet. This sheet has a higher affinity for the adhesive of the transfer adhesive stock strip then does the transfer adhesive stock backing 13. This is a general characteristic of bond paper. The remainder of the application is conventional means.

In the utilization of the apparatus, strips of the transfer adhesive stock 43 are applied to a portion of the face 21 of the sheet so that the transfer adhesive stock adhesive contacts the sheet face 21 and so that the sheet material surrounds the transfer adhesive stock strips. After this step, the individual integral labels are die cut from face 23 of the sheet 3 within the area of the sheet overlying the transfer adhesive stock without cutting the transfer adhesive stock backing. Indicia is printed on the face 23, typically downstream of the downstream of the vacuum cylinder which applies the strips. The label then can be removed by simply peeling it back.

It will be understood that since the back of the label liner is not silicone coated, it may be printed on after applying the transfer adhesive stock to the sheet. Additionally, because the back of the liner is not silicone coated, the improved label forms handle better in printers and will not slide when stacked. Also, the reduced thickness makes the forms flatter and easier to handle.

Finally, since the rolls of transfer adhesive stock can be more tightly wound then conventional transfer tapes, rolls of the improved transfer adhesive stock of this invention can be larger and are easier to handle. This is especially so because no adhesive is exposed.

In view of the above, it would be seen that the several objects of the invention are achieved and other advantageous results obtained.

As various changes could be made in the above constructions without departing from the scope of the invention, it is intended that all matter contained in the above description are shown in the accompanied drawings shall be interpreted as illustrated and not an unlimiting sense.

What is claim is:

1. A method for making a business form with a label removable from the form comprising the steps of:

a) removing the first liner from at least one piece of transfer adhesive stock, consisting essentially of of first and second liners sandwiching a layer of pressure sensitive adhesive between one side of the first liner and one side of the second liner, leaving a web of second liner with adhesive disposed thereon;

b) cutting the web of second liner with adhesive disposed thereon into patches;

c) laminating at least one patch of the second liner with adhesive disposed thereon to a substrate form, within its periphery, using the adhesive disposed on the second liner.

2. The method of claim five further comprising the step of creating a removable label within the form by die cutting through the substrate form and adhesive and to but not through the second liner.

* * * * *

UNITED STATES PATENT AND TRADEMARK OFFICE

CERTIFICATE OF CORRECTION

PATENT NO. : 6,068,037

DATED : May 30, 2000

INVENTOR(S) : Thomas Yeager
Charles Casagrande

It is certified that error appears in the above-identified patent and that said Letters Patent are hereby corrected as shown below:

Column 4, line 36, delete the second occurrence of "of".

Column 4, line 47, delete "five" and insert -- 1--.

Signed and Sealed this

Seventeenth Day of April, 2001

*Attest:*

NICHOLAS P. GODICI

*Attesting Officer*

*Acting Director of the United States Patent and Trademark Office*